United States Patent [19]

Checkley et al.

[11] Patent Number: 4,645,166
[45] Date of Patent: Feb. 24, 1987

[54] SOFA CLAMP-QUICK RELEASE CLAMP FOR VEHICLE SEATS

[75] Inventors: James D. Checkley, Middlebury; Larry E. Oberholser, Elkhart, both of Ind.

[73] Assignee: Hamco Manufacturing, Inc., Elkhart, Ind.

[21] Appl. No.: 761,197

[22] Filed: Jul. 31, 1985

[51] Int. Cl.⁴ ............................................. A47B 97/00
[52] U.S. Cl. .................................. 248/503.1; 248/510
[58] Field of Search ...................... 248/503.1, 503, 500, 248/510, 501, 507, 502; 269/93, 94; 296/65 R; 297/15

[56] References Cited

U.S. PATENT DOCUMENTS

| | | | |
|---|---|---|---|
| 414,957 | 11/1989 | Van Horn et al. | |
| 901,561 | 10/1908 | Searing | |
| 2,733,492 | 2/1956 | Copell | 248/507 X |
| 3,915,493 | 10/1975 | Brown | |
| 3,991,968 | 11/1976 | Yazejian | 248/503 X |
| 4,055,320 | 10/1977 | Bengtsson | |
| 4,114,947 | 9/1978 | Nelson | |
| 4,230,432 | 10/1980 | Howell | |
| 4,261,466 | 4/1981 | Wilford | |
| 4,277,043 | 7/1981 | Weik | 248/503.1 |
| 4,376,522 | 3/1983 | Banks | 248/503.1 |
| 4,493,470 | 1/1985 | Engel | |
| 4,496,271 | 1/1985 | Spinosa | |

Primary Examiner—Ramon O. Ramirez
Attorney, Agent, or Firm—Barnes & Thornburg

[57] ABSTRACT

A quick-release clamp is provided having a retaining bracket fixed to the vehicle, a clamping arm for releasably engaging a portion of the seat leg, and an interlocking mechanism detachably secured to the retaining bracket for fixedly mounting the clamping arm and the seat engaged thereby. The retaining bracket includes a keyed slot leading to an enlarged cavity. The clamping arm includes a hooked portion for overlaying the seat leg. The interlocking device includes a bolt having a T-shaped or winged head which is insertable within the keyed slot and rotatable within the cavity to a position which prevents its removal through the keyed slot. One end of the bolt passes through the clamping arm and a locking handle is secured to that end. Upon initial locking rotation of the locking handle, the bolt head rotates within the cavity to the non-removable position. Subsequent locking rotation of the locking handle fixedly secures the clamping arm to the retaining bracket and, thereby, the seat leg to the vehicle floor. Minimal unlock rotation of the locking handle returns the bolt head to alignment with the keyed slot for removal.

12 Claims, 4 Drawing Figures

SOFA CLAMP-QUICK RELEASE CLAMP FOR VEHICLE SEATS

BACKGROUND AND SUMMARY OF THE INVENTION

The present invention relates generally to vehicle-mounted bracket assemblies. More particularly, this invention relates to quick-release mounting brackets for removably securing passenger seats within vehicles.

It has been desirable to mount vehicle passenger seats, especially bench and sofa seats in vans and trucks, so that they can be occasionally removed to provide greater floor space for cargo. However, the mounting assemblies for these removable seats must be ruggedly designed to withstand the particular stresses due to the normal moving vehicle environment. Federal Motor Vehicle Safety Standards also impose exacting requirements on such mounting assemblies to ensure passenger safety in collision environments. Moreover, to ensure commercial marketability, it is important that seat mounting devices be reliable, easy to use, and inexpensive to produce.

Previously, it has been suggested to secure the passenger seat to the vehicle interior floor or support surface by bolts passing through lower flanges on the seat legs and into the floor. Alternatively, separate flanges or brackets would overlay or hook onto the seat legs and the bolt would pass through that bracket to the floor. In either construction it was necessary to precisely align the bolt holes, a sometimes difficult task with heavily carpeted floors. Also, particular tools were necessary to properly secure the nut bolt at the required torque. Further, periodic visual inspecion to ascertain securement typically required access to hidden surfaces or placing the vehicle on a lift to view its underside.

Other proposed assemblies have required brackets and latches to be permanently fixed to either the seat legs or the vehicle floor (and sometimes both). Unfortunately, the former arrangement permits the latches to be inadvertently damaged or misaligned when the seat is removed from the vehicle and stored or used for other purposes. The latter arrangement results in often inconveniently located protrusions on the vehicle floor, significantly reducing usable floor space.

With regard to prior assembly mechanisms, spring-loaded retaining brackets have lacked long-term reliability and can inhibit quick release of the seat. Floor mounted retaining tracks require precise mounting alignment and maintenance (to keep free of dirt and debris) and often lack durability. Complicated latching locks are expensive to produce and often difficult to use properly.

Accordingly, it is an object of the present invention to provide an inexpensive and reliable quick release mounting bracket for vehicle passenger seats.

Another object is the provision of a seat releasable mounting assembly which permits maximum use of floor space when the seat is removed from the vehicle.

A further object is to provide simplified method of releasably mounting a vehicle seat without requiring additional tools.

Yet another object is the provision of a vehicle seat mounting assembly having durable construction which safely supports the vehicle seat at the vehicle floor.

These and other objects of the present invention are achieved with the provision of a quick-release clamp having a retaining bracket fixed to the vehicle, a clamping arm for releasably engaging a portion of the seat leg, and an interlocking mechanism detachably secured to the retaining bracket for fixedly mounting the clamping arm and the seat engaged thereby. The retaining bracket includes a keyed slot leading to an enlarged cavity. The clamping arm includes a hooked portion for overlaying the seat leg. The interlocking device includes a bolt having a T-shape or winged head which is insertable within the keyed slot and rotatable to within the cavity to a position which prevents its removal through the keyed slot. One end of the bolt passes through the clamping arm, and a locking handle is secured to that end. Upon initial locking rotation of the locking handle, the bolt head rotates within the cavity to the non-removable position. Subsequent locking rotation of the locking handle fixedly secures the clamping arm to the retaining bracket and, thereby, the seat leg to the vehicle floor. Minimal unlocking rotation of the locking handle returns the bolt head to alignment with the slot for removal therethrough.

Other objects, advantages and novel features of the present invention will become apparent from the following detailed description of the invention when considered in conjunction with the accompanying drawings.

DESCRIPTION OF THE PREFERRED EMBODIMENTS

Figure 1:
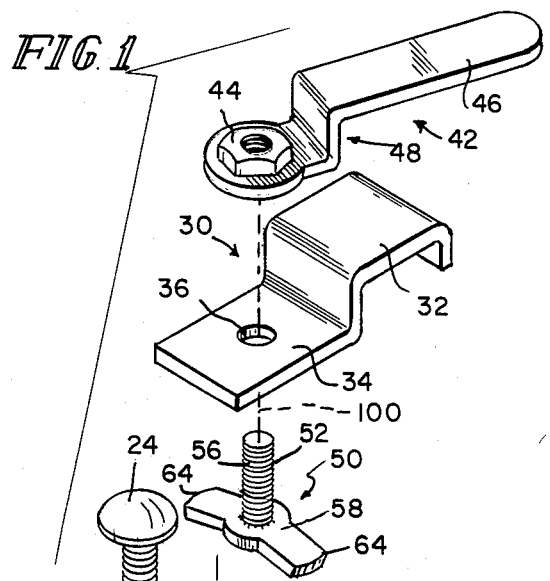
FIG. 1 is an exploded perspective view of a quick-release bracket assembly embodying the principles of the present invention.

FIG. 1, which illustrates a preferred embodiment of the present invention, shows a quick-release bracket assembly having a retaining bracket 10, a clamping arm 30, and an interlocking means 40. The principle individual components of the bracket assembly are shown as exploded along axis 100. That axis is the rotational axis for interlocking means 40.

Retaining bracket 10 includes mounting bolt holes 12 and 14 and keyed slot 16. Retaining bracket 10 is, for example, made from a metal plate stamped or bent at its side edges to form downwardly extending support legs 18. Thus, a recess or cavity 22 is created between legs 18 and the connecting bight 20. Athough not specifically illustrated, the present invention also contemplates the use of reinforcing ridges and depressions bridging legs 18.

Retaining bracket 10 is, for example, fixedly mounted to the vehicle floor or support surface by mounting bolts 24, passing through holes 12 and 14 as well as the floor, and securing by nuts 26 on the vehicle underside. During normal usage, the present invention contemplates that retaining bracket 10 will remain fixed to the vehicle at all times. Retaining bracket 10 is configured to have a low profile with respect to the vehicle floor so as not to reduce usable floor space when the passenger seat is removed. Where the floor is carpeted, retaining bracket 10 can be mounted either over the carpet or within cut-out portions.

Clamping arm 30 includes hook portion 32, for engaging a portion of the seat, and flat portion 34. Hook portion 32 is, for example, formed so as to overlay a lower tubular leg or support of the passenger seat and retain that tubular member against bight 20 of retaining bracket 10 (see FIG. 4) or against the vehicle floor directly. Where the lower-most structural portion of the seat is of a non-tubular configuration, portion 32 can be configured for substantially mating engagement. Flat portion 34 includes hole 36 through which parts of interlocking means 40 are receivable, as described below. Clamping arm 30 is, for example, formed from a stamped or bent metal plate.

Interlocking means 40 includes locking handle 42 and locking bolt 50. Locking handle 42 has a lock nut 44 and a lever portion 46. Where, for example, lock nut 44 and lever portion 46 are initially separate elements subsequently welded together, lever portion 46 is formed from a hex nut wrench having bend 48 to accommodate the configuration of hook portion 32. Although not specifically illustrated, the present invention contemplates that lock nut 44 and lever portion 46 can be utilized in this invention as separable elements.

Figure 2:
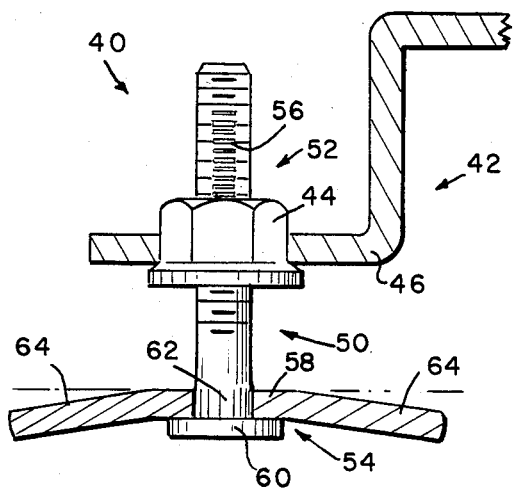
FIG. 2 is an enlarged plan view of a locking bolt suitable for use in the quick-release bracket assembly of FIG. 1.

Locking bolt 50, as illustrated in the enlarged view of FIG. 2, includes threaded portion 52 and head portion 54. Lock nut 44 (shown in phantom in FIG. 2) is threadably received onto threaded portion 52. At least part of threaded portion 52 at the end of bolt 50 opposite head portion 54 has a means 56 of restricting threading rotation of lock nut 44 about threaded portion 52. This rotation restricting means 56 is, for example, created by partially flattening several threads of bolt 50 after lock nut 44 has been threaded thereby toward head portion 54. This flattening entirely prevents or, alternatively, merely inhibits threading removal of lock nut 44 from bolt 50. Although not specifically illustrated, the present invention also contemplates that rotation restricting means 56 can extend over the entire longitudinal length of threaded portion 52.

Head portion 54 includes projection nut 58 and bolt cap 60. Nut 58 is non-rotatably connected to cap 60 by, for example, mating teeth arrangement 62. Nut 58 has inclined projecting surfaces 64 extending laterally outward from bolt 50. The configuration of head portion 54 is such that in a particular orientation it is insertable into keyed slot 16.

Figure 4:
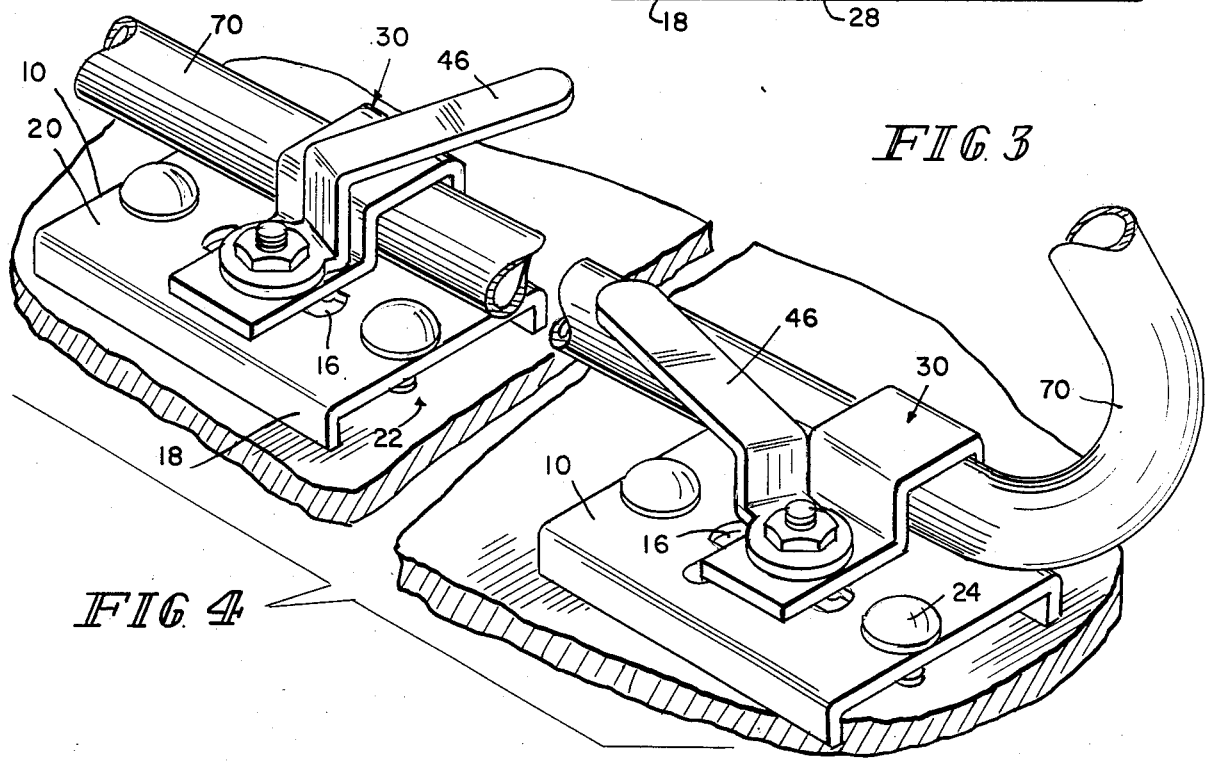
FIG. 4 is a top perspective plan view of the quick-release bracket assembly of FIG. 1 as applied to secure a seat to a carpeted vehicle floor.

As assembled for use, locking bolt 50 is inserted through hole 36 and then lock nut 44 is partially threaded along threaded portion 52 preferably to approximately the orientation illustrated in FIG. 2. When a lower portion of the seat, shown as pipe 70 in FIG. 4, is disposed on or adjacent retaining bracket 10, clamping arm 30 and interlocking means 40 are disposed such that hook portion 32 overlies and engages pipe 70 and head portion 54 is inserted through keyed slot 16 and into cavity 22.

Figure 3:
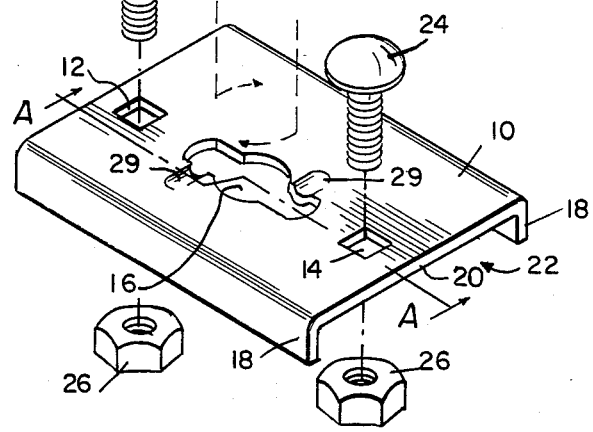
FIG. 3 is a cut-away side view along line AA of FIG. 1 of the retaining bracket shown therein.
Figure 3:
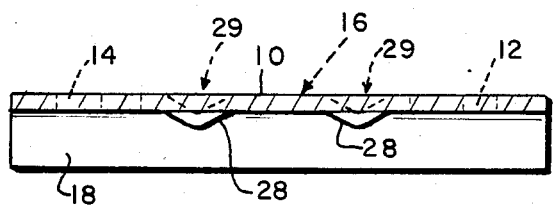

As shown in FIG. 3, the underside of bight 20 includes inclined projections 28 at opposite ends and sides of keyed slot 16 which are formed, for example, from depressions 29 in the top surface of retaining bracket 10. The relative dimensions of cavity 22 and head portion 54 are such that, when lock nut 44 is not completely threaded onto bolt 50, head portion 54 is freely rotatable within cavity 22, but not removable therefrom through slot 16 if rotated out of alignment with slot 16. Rotation restricting means 56 causes sufficient frictional or mechanical engagement between lock nut 44 and bolt 50 that initial rotation of lock nut 44 (clockwise about axis 100) by lever portion 46 after head portion 54 is inserted into keyed slot 16 forces head portion 54 to rotate within cavity 22 (likewise about axis 100). Head portion 54's rotation will continue until the lateral projections of nut 58 abut against downward projections 28 which serve as rotation stops. Continued rotation of lock nut 44 causes it to threadingly rotate along bolt 50 toward head portion 54. Flat portion 34 is thereby carried toward the upper surface of bight 20.

Further such threading rotation of lock nut 44 causes bight 20 to be clamp between projection nut 58 and flat portion 34. Similarly, flat portion 34 is thereby clamped between bight 20 and lock nut 44. As a result, pipe 70 is fixedly retained with respect to clamping arm 30, retaining bracket 10, and the vehicle floor, as shown in FIG. 4. To completely secure a given passenger seat at a particular vehicle floor location, the present invention also contemplates that a plurality of such quick-release bracket assemblies may be employed.

To remove a passenger seat from the bracket assembly of the present invention, lock nut 44 is threadingly rotated away from head portion 54 (counterclockwise about axis 100). The amount of unlocking rotation necessary to unclamp bight 20 from flat portion 36 and nut 58 is greatly reduced because of the cooperative locking orientation of inclined surfaces 64 with respect to the inclined sides of projections 28. This cooperation assists in the quick release of the bracket assembly, although the present invention also contemplates embodiments wherein only surfaces 64 or projections 28 are so inclined since reduced unlocking rotation also results thereby. Once no longer fixedly clamped with respect to bight 20, rotation restricting means 56 will cause further unlocking rotation of lock nut 44 to rotate head portion 54 back into alignment with keyed slot 16.

The particular orientation of projections 28 at the opposite ends and opposite sides of slot 16 permit them to serve the function of rotation stops for unlocking rotation as well. Thus, re-alignment of head portion 54 with keyed slot 16 is assured and readily detectable by the user. Further unlocking rotation is unnecessary since head portion 54 can be merely lifted out of slot 16, and thereby clamping arm 30 will release pipe 70. When the passenger seat is removed from the vehicle, clamping arm 30 and interlocking means 40 can be either reclamped to bracket 10 (if maximum floor space is not essential) or stored elsewhere.

Even where a plurality of bracket assemblies are employed for a given seat, the present invention avoids the initial installation and mounting alignment difficulties of prior seat retaining devices having slotted mounting tracks. Also, since retaining bracket 10 is open at both ends, cleaning dirt and debris within cavity 22 is relatively simple. Further, the present invention is readily applicable to a wide variety of passenger seats without the use of any tools after initial installation.

From the preceding description of the preferred embodiments, it is evident that the objects of the present invention are attained. Although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A quick-release clamp, for removably securing a seperable passenger seat to a motor vehicle support surface, comprising:

a retaining bracket, mounted to said vehicle support surface, including a clamping cavity and a slotted portion for providing entry into said cavity;

clamping means releasably engaging said passenger seat and maintaining it in a fixed relation to said clamping means; and interlocking means, detachably securing said clamping means to said retaining bracket, including a threaded bolt having laterally extending projections on the head portion thereof, said head portion being dimensioned so as to be insertable within said slotted portion and extendable into said cavity and to be rotatable within said cavity to a position restricting removal therefrom, said bolt also engaging said clamping means, and said interlocking means further including locking handle means, threadably engaging said bolt, for rotatably orienting said head portion with respect to said retaining bracket.

2. The quick-release bracket according to claim 1 wherein said locking handle includes a nut portion and, upon insertion of said head portion into said cavity, threading rotation of said locking handle secures said retaining bracket between said head portion and said nut portion.

3. The quick-release bracket according to claim 2 wherein said bolt includes a portion restricting threading rotation whereat rotation of said locking handle causes corresponding rotation of said head portion.

4. The quick-release bracket according to claim 3 wherein said laterally extending projections are non-rotatably connected to said bolt.

5. The quick-release bracket according to claim 1 wherein said cavity includes stops to restrict rotation of said head portion beyond a predetermined position by engagement with said laterally extending projections.

6. The quick-release bracket according to claim 5 wherein said laterally extending projections and said stops include cooperatively inclined surfaces for quick-release clamping engagement.

7. The quick-release bracket according to claim 1 wherein said slotted portion includes an elongated opening and said head portion is dimensionally keyed to fit therein.

8. The quick-release bracket according to claim 1 wherein said clamping surface means includes a portion thereof formed so as to matingly receive a portion of said passenger seat.

9. A method of releasably securing a passenger seat to a motor vehicle support surface, comprising:

initially disposing a lower portion of said passenger seat adjacent a retaining bracket fixed to said vehicle support surface, said bracket having a cavity therein accessable by a keyed slot;

mounting a detachable clamping assembly over a portion of said passenger seat and inserting a locking bolt of said clamping assembly through said keyed slot and into said cavity, said locking bolt being rotatable within said cavity and having projections thereon which are engageable with the surface of said cavity to prevent removal of said locking bolt; and rotating said locking bolt so as to prevent its removal from said cavity, said locking bolt being related to said clamping assembly such that such rotation fixedly secures said lower portion of said passenger seat with respect to said vehicle support surface.

10. A quick release clamp for detachably securing a seat to a support surface to a motor vehicle, comprising:

retaining means disposed on said support surface, said retaining means including a cavity therein, clamping means for engaging a portion of said seat, interlocking means detachably securing said clamping means to said retaining means and simultaneously detachably securing said clamping means to said seat, said interlocking means having a first portion engageable with said clamping means and second portion engagable with said retaining means, and said second portion including at least one lateral projection insertable into said cavity and rotatable therein to a secured position preventing removal of said second portion from said retaining means.

11. The quick-release clamp according to claim 10, wherein said second portion and said first portion are interconnected such that rotation of said second portion to said secured position results in said securing of said clamping means to said retaining means and said securing of said clamping means to said seat.

12. The quick-release clamp according to claim 10 wherein said first portion of said interlocking means includes an elongated shaft member received by said clamping means and includes an end member mounted to said shaft member for retaining said clamping means and whereby locking rotation of said end member coincident with rotation of said shaft member causes said second portion to rotate to said secured position and locking rotation of said end member relative to said shaft member causes said clamping means to be fixed with respect to said retaining means and with respect to said seat.

* * * * *